United States Patent [19]
Martin

[11] Patent Number: 5,653,449
[45] Date of Patent: Aug. 5, 1997

[54] SEAL ASSEMBLY

[75] Inventor: Jon W. Martin, Los Alamitos, Calif.

[73] Assignee: TRW Inc., Lyndhurst, Ohio

[21] Appl. No.: 534,281

[22] Filed: Sep. 27, 1995

[51] Int. Cl.⁶ ............................................ F16J 15/32
[52] U.S. Cl. .................................... 277/136; 277/152
[58] Field of Search ........................... 277/136, 215, 277/165, 152, 188 R, 189, 227

[56] References Cited

U.S. PATENT DOCUMENTS

| | | | |
|---|---|---|---|
| 3,636,824 | 1/1972 | Clark | 277/165 |
| 4,067,584 | 1/1978 | Hunger | 277/165 |
| 4,427,204 | 1/1984 | Alley | 277/189 |
| 4,834,037 | 5/1989 | Lafever | 277/152 |
| 4,856,794 | 8/1989 | Boyers et.al. | 277/136 |
| 5,018,753 | 5/1991 | Porel | 277/136 |
| 5,269,539 | 12/1993 | Martin | 277/152 |
| 5,395,125 | 3/1995 | Porel | 277/136 |

FOREIGN PATENT DOCUMENTS

| | | | |
|---|---|---|---|
| 3-79868 | 4/1991 | Japan | 277/165 |
| 551855 | 3/1943 | United Kingdom | 277/137 |

*Primary Examiner*—Scott Cummings
*Attorney, Agent, or Firm*—Tarolli, Sundheim, Covell, Tummino & Szato

[57] ABSTRACT

A seal assembly (10) includes a relatively rigid seal holder (12) and a relatively soft O-ring seal member (14). The seal member (14) is disposed in an annular groove (16) in the seal holder (12). A plurality of ribs (70) are disposed between the seal member (14) and the bottom (76) of the annular groove (16) in the seal holder (14) to retard rotation of the seal member (14) relative to the seal holder (12). In one embodiment of the invention, the ribs (70) are integrally formed as one piece with the seal holder (12) and engage an outer side surface (72) of the seal member (14). In another embodiment of the invention, the ribs (70) are integrally formed as one piece with the seal member (14a) and engage a smooth arcuate bottom of an annular groove in a seal holder. In another embodiment of the invention, both the seal holder (12) and the seal member (14a) are provided with ribs (70 and 70a).

1 Claim, 2 Drawing Sheets

SEAL ASSEMBLY

BACKGROUND OF THE INVENTION

The present invention relates to a new and improved seal assembly and more specifically to a seal assembly which includes a seal holder having an annular groove in which a seal member is disposed.

Various known seal assemblies have been used in association with rotatable shafts of hydraulic motors or pumps. These motors or pumps may have a construction generally similar to the construction disclosed in U.S. Pat. Nos. 4,219,313 and 5,061,160.

Because of the high cost of PNF (trademark) (phosphonitrilic fluoroelastomer) synthetic rubber, it is desirable to minimize the amount of PNF (trademark) used in a seal assembly. However, it is desirable to use PNF (trademark) special purpose synthetic rubber as the active portion of a hydraulic seal assembly in order to obtain the advantages of having a relatively soft and durable synthetic rubber to form a seal against a hard member. In order to minimize the cost of a seal assembly, it is also preferred to eliminate metal reinforcing elements and/or garter springs. Although the garter springs are relatively low in cost, they must be installed after the molding process and sometimes pop off and are lost.

SUMMARY OF THE INVENTION

The present invention provides a new and improved seal assembly which is used with a rotatable shaft. The seal assembly includes a holder having an annular groove in which an annular seal member is disposed. The annular seal member sealingly engages the rotatable shaft. To retard rotation of the annular seal member relative to the seal holder, a plurality of ribs are disposed between the annular seal member and the bottom of the groove.

In one specific embodiment of the invention, the ribs which retard rotation of the annular seal member are a portion of the seal holder. In another embodiment of the invention, the ribs are a portion of the annular seal member. In still another embodiment of the invention, some of the ribs are a portion of the seal holder and other ribs are a portion of the annular seal member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF SPECIFIC PREFERRED EMBODIMENTS OF THE INVENTION

General Description

Figure 2:
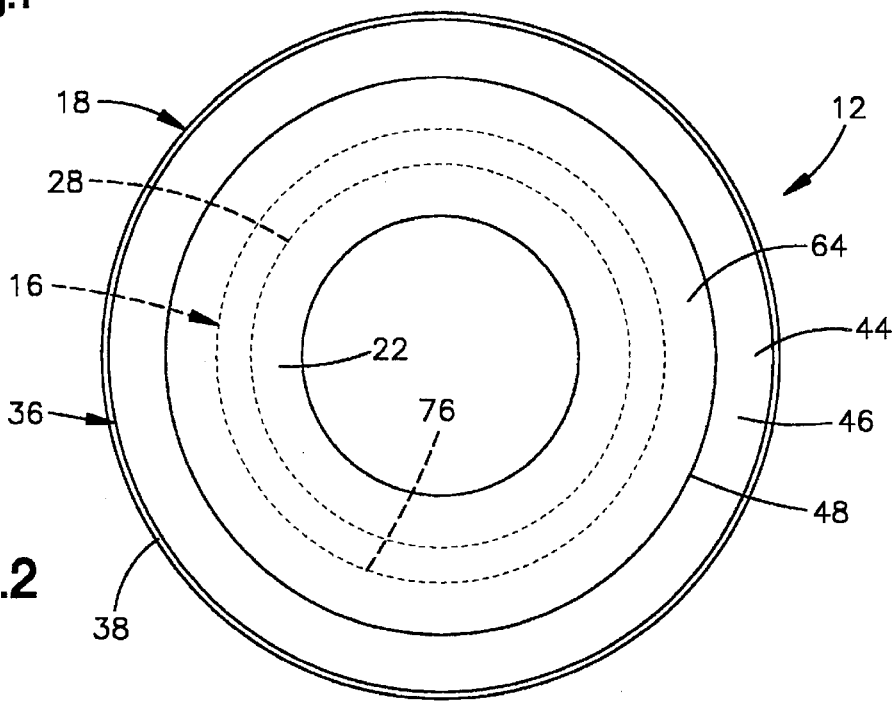
FIG. 2 is a plan view, taken generally along the line 2—2 of FIG. 1 and further illustrating the construction of the seal holder.
Figure 3:
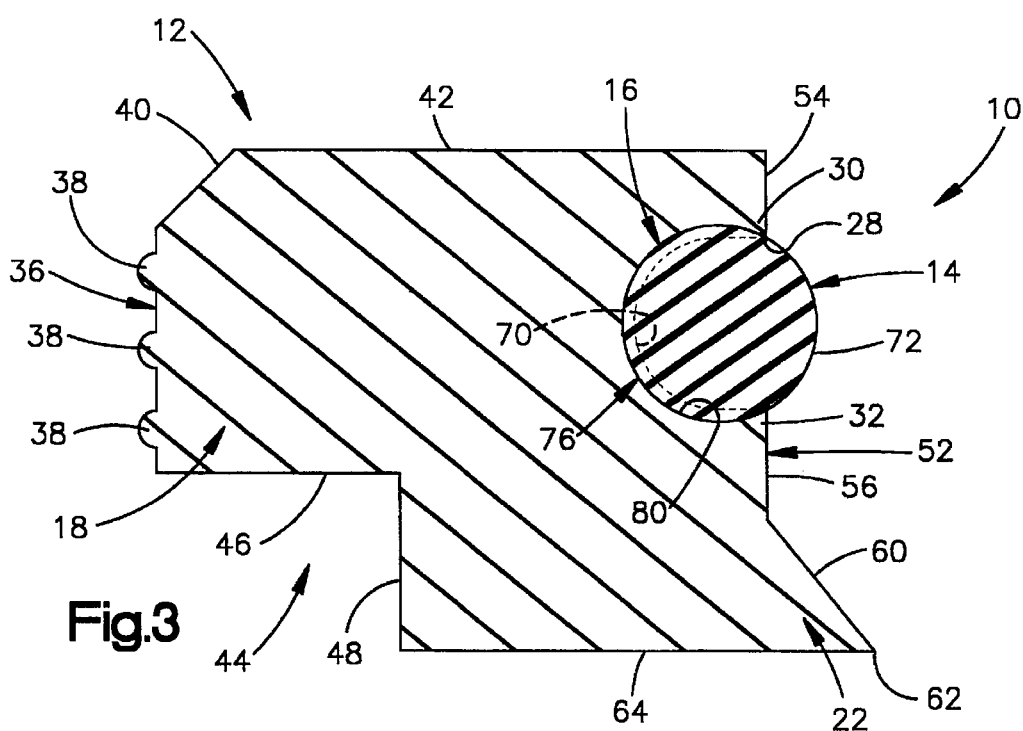
FIG. 3 is an enlarged radial sectional view of a portion of a seal assembly constructed in accordance with the present invention and illustrating the relationship between the seal holder of FIGS. 1 and 2 and an annular seal member.

A seal assembly 10 (FIG. 3) includes an annular seal holder 12 (FIGS. 1 and 2) and an annular seal member 14 (FIG. 3). The seal member 14 is disposed in an annular groove 16 (FIGS. 1–3) in the seal holder 12. The seal holder 12 supports the annular seal member 14 for sealing engagement with a shaft or other member.

In the illustrated embodiment of the invention, the annular seal member 14 is a commercially available O-ring having a circular cross sectional configuration as viewed in a plane extending radially through the seal member and containing a central axis of the seal member. Although it is preferred to use a commercially available O-ring as the annular seal member 14, it is contemplated that other seal members having different constructions could be utilized if desired.

The seal holder 12 is formed of a polymeric material which is stiff at operating temperatures to which it is exposed. This enables the seal holder 12 to support the soft annular seal member 14. It is contemplated that the seal holder 12 may be highly crosslinked and may have a hardness of between 85 and 95 Shore A. It is believed that it may be desired to provide relatively long (¼ inch) fibers in the polymeric material forming the seal holder 12 to increase the resistance of the seal holder to deformation.

The seal holder 12 may be formed of NBR (nitrile-butadiene rubber), HNBR (hydrogenated nitrile-butadiene rubber), a fluorocarbon polymer, or Aflas (trademark) (a copolymer of propylene and tetrafluoroethylene). Of course, the seal holder 12 may be formed of other known materials if desired.

The annular seal member 14 (FIG. 3) is formed of a material which is softer than the seal holder 12. Since the annular seal member 14 is formed of a material which is softer than the seal holder 12, the annular seal member can be readily deflected to form a fluid tight seal with a shaft or other hard member. The relatively soft annular seal member 14 is supported in tight sealing engagement with a shaft by the seal holder 12. It is preferred that the annular seal member 14 have a 55–80 Shore A hardness and preferably a Shore A hardness of 65–70.

The annular seal member 14 is preferably formed of PNF (trademark) (phosphonitrilic fluoroelastomer). However, the annular seal member 14 could be formed of a silicone rubber. It is contemplated that the annular seal member 14 could be formed of other relatively soft polymeric materials and could have a configuration which differs from the configuration of commercially available O-rings.

Seal Holder

The seal holder 12 is integrally molded as one piece of polymeric material. The seal holder 12 includes an annular main body section 18 having a generally polygonal cross sectional configuration. The annular groove 16 is formed in the main body section 18 and has a generally toroidal configuration.

The seal holder 12 also includes an annular seal lip 22 which is integrally molded as one piece with the main body section 18. The seal lip 22 projects radially inward from the main body section 18. The annular seal member 14, annular groove 16, main body section 18, and seal lip 22 all have a common central axis 24 (FIG. 1).

Figure 1:
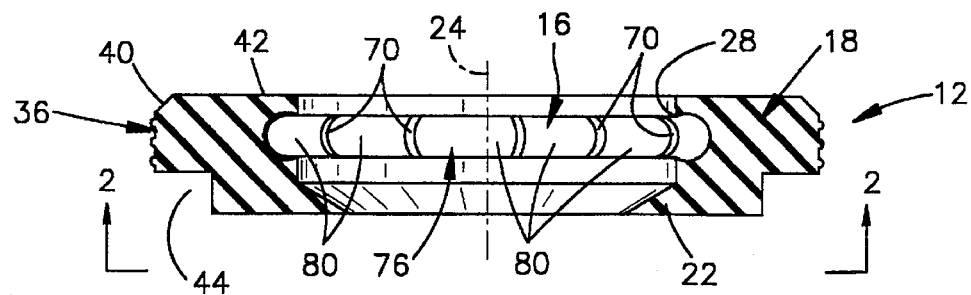
FIG. 1 is a sectional view of a seal holder which is used in a seal assembly constructed in accordance with the present invention.

The annular groove 16 includes a mouth 28 (FIG. 3) which is disposed in a cylindrical plane having a central axis coincident with the axis 24 (FIG. 1). The annular seal member 14 is inserted into the groove 16 through the circular mouth 28 of the groove. However, the mouth 28 of the groove 16 has an axial extent which is less than a cross sectional diameter of the annular seal member 14 as viewed in a plane which contains a radius and the central axis 24 of the annular seal member. Therefore, the annular seal member 14 is resiliently deflected as the seal member is inserted into the annular groove 16 through the mouth 28 of the groove.

The main body section 18 of the seal holder 12 has an annular axially inner or upper (as viewed in FIG. 3) lip 30 which engages an axially inner portion of the annular seal member 14 to support the seal member. In addition, the main body section 18 has an annular axially outer or lower (as viewed in FIG. 3) lip 32 which engages an axially outer potion of the annular seal member 14 to support the seal member.

A radially outer side 36 of the main body section 18 of the seal holder 12 has a cylindrical configuration and has a central axis which is coincident with the central axis 24 of the annular groove 16. A plurality of axially spaced annular ribs 38 (FIG. 3) project radially outward from the outer side 36. Each of the ribs 38 has a semicircular cross sectional configuration as viewed in a radial plane containing the central axis 24 of the seal holder 12. The annular ribs 38 are continuous and extend completely around the periphery of the main body section 18. The annular ribs 38 are disposed radially outward from the annular groove 16.

The main body section 18 has an axially tapered annular end surface 40 which forms a portion of a right circular cone having a central axis coincident with the axis 24 (FIG. 1). The end surface 40 (FIG. 3) extends between the cylindrical radially outer side 36 and a flat annular inner end surface 42 on the main body section 18. The flat annular side surface 42 has a central axis which is coincident with the axis 24 (FIG. 1).

An annular retainer recess 44 (FIG. 3) faces radially and axially outward from the main body section 18. The annular retainer recess 44 is formed by a flat annular side surface 46 which extends parallel to the flat annular inner side surface 42 of the main body section 18. The side surface 46 of the retainer recess 44 is disposed radially and axially outward of the annular groove 16 in which the seal member 14 is disposed (FIG. 3).

In addition, the retainer recess 44 is defined by a cylindrical side surface 48. The cylindrical side surface 48 has a central axis which is coincident with the axis 24 (FIG. 1) and extends perpendicular to the side surface 46 of the retainer recess 44. The cylindrical side surface 48 (FIG. 3) of the retainer recess 44 is concentric with the cylindrical radially outer side 36 of the main body section 18 of the seal holder 12.

The main body section 18 of the seal holder 12 has a cylindrical radially inner side 52 having a central axis coincident with the axis 24. The inner side 52 includes an axially inner cylindrical side surface 54 which extends between the mouth 28 (FIG. 3) of the groove 16 and the flat annular inner side surface 42 of the main body section 18. The cylindrical side surface 54 of the inner side 52 partially defines the inner lip 30 which engages the seal member 14.

In addition, the cylindrical inner side 52 includes an axially outer cylindrical side surface 56 which extends between the mouth 28 of the groove 16 and the seal lip 22.

The side surface 56 has a central axis which is coincident with the axis 24 and has the same diameter as the inner side surface 54. The diameter of the cylindrical inner side 52 of the main body section 18 is less than the inside diameter of the annular seal member 14. Therefore, the annular seal member 14 projects radially inward from the inner side 52 of the main body section 18.

The annular seal lip 22 projects radially inward from the body section 18 and has a central axis which is coincident with the axis 24. The annular seal lip 22 has a triangular cross sectional configuration as viewed in a radial plane containing the central axis 24 of the seal holder 12. The seal lip 22 has a radially inward and axially outward sloping side surface 60.

The side surface 60 extends between the axially outer side surface 56 of the inner side 52 and a circular tip 62 of the seal lip 22. The sloping side surface 60 forms a portion of a right circular cone having a central axis which is coincident with the axis 24. The circular tip 62 of the seal lip 22 has a diameter which is smaller than the inside diameter of the annular seal member 14.

A continuous flat annular side surface 64 forms an axially outer side of the seal lip 22 and an axially outer side of the main body section 18 of the seal holder 12. The sloping side surface 60 of the seal lip 22 and the outer side surface 64 intersect at the tip 62 of the seal lip and are disposed at an angle of approximately 30° relative to each other. The annular outer side surface 64 is disposed in a plane which extends perpendicular to the central axis 24 of the seal holder 12 and parallel to the inner side surface 42.

Annular Seal Member and Groove

Figure 4:
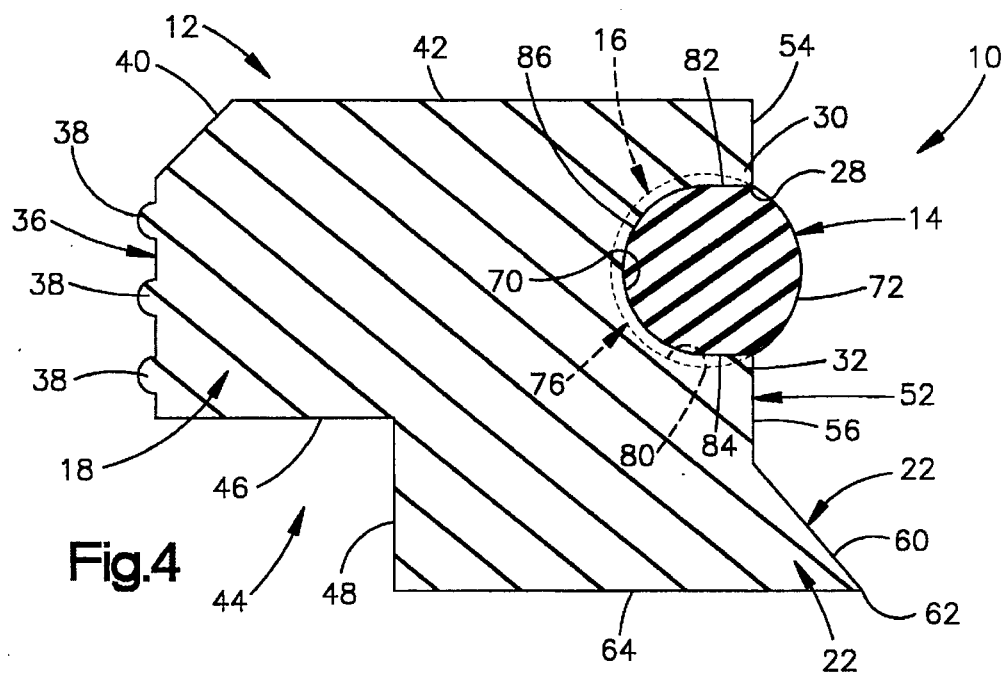
FIG. 4 is an enlarged sectional view, generally similar to FIG. 3, illustrating the relationship of the annular seal member to a rib which is a portion of the seal holder.

In accordance with one of the features of the present invention, the annular groove 16 has a plurality of ribs 70 (FIGS. 1, 3 and 4). The ribs 70 (FIG. 4) press against a smooth toroidal outer side surface 72 on the annular seal member 14 and retain the seal member against rotation relative to the seal holder 12. A radially inner portion of the annular seal member 14, that is, the portion of the seal member which projects radially inward through the mouth 28 of the groove 16, is engageable with a rotatable shaft or other member.

Force is transmitted from the rotatable shaft to the annular seal member 14 (FIG. 4). This force tends to rotate the seal member relative to the stationary seal holder 12. The ribs 70 press against the radially outer portion of the annular seal member 14 to deflect the elastomeric material of the seal member. The resulting indentations in the outer side surface 72 of the annular seal member 14 and frictional engagement between the ribs 70 and the seal member holds the seal member against rotation under the influence of force applied to the seal member by the rotatable shaft. If desired, the ribs 70 could be constructed so as to penetrate the outer side surface 72 of the seal member 14.

The annular groove 16 has an arcuate bottom 76 (FIGS. 1 and 3) which is disposed in tight sealing engagement with the outer side surface 72 of the annular seal member 14. The ribs 70 project radially inward from the bottom 76 (FIG. 4) and seal against the outer side surface 72 on the seal member 14. The ribs 70 resiliently deflect the elastomeric material of the seal member 14. The resilient material of the seal member 14 is deflected in such a manner that it engages the bottom 76 of the groove 16 at locations between the ribs 70 (FIG. 3).

The ribs 70 divide the annular bottom 76 of the groove 16 into a plurality of arcuate segments 80 (FIGS. 1) which are disposed between the ribs 70. The circular outer side surface 72 of the annular seal member 14 (FIG. 3) is disposed in sealing engagement with the segments 80 of the bottom 76 throughout the extent of each of the segments. Thus, the resilient elastomeric material of the annular seal member 14 is deflected radially inward at the locations where it is engaged by the ribs 70. The resilient elastomeric material of the annular seal member 14 is pressured by the segments 80 of the bottom 76 of the groove 16 to conform to the configuration of the inside of the annular groove.

The segments 80 of the bottom 76 of the annular groove 16 have a generally C-shaped cross sectional configuration in a radial plane which contains the central axis 24 of the seal holder 12 (FIG. 3). Each segment 80 of the bottom 76 of the annular groove 16 extends from the mouth 28 of the groove to a radially outermost portion of the groove. Adjacent to the mouth 28 of the groove, the segments 80 of the bottom 76 form inner side surface areas on the annular axially inner and outer lips 30 and 32 which retain the annular seal member 14 in the groove 16.

The ribs 70 are molded as one piece with the main body section 18 and extend radially outward from the lips 30 and 32 at the mouth 28 of the groove 16. Each of the ribs 70 has a generally U-shaped configuration. Thus, each of the ribs 70 has parallel leg portions 82 and 84 (FIG. 4) and an arcuate bight portion 86.

The leg portions 82 and 84 (FIG. 4) extend parallel to the axially inner and outer side surfaces 42 and 64 of the seal holder 12. The arcuate bight portion 86 of each of the ribs 70 has a semi-circular configuration as viewed in a plane containing a radius and the central axis 24 of the seal holder 12. The C-shaped bight portion 86 of each of the ribs 70 opens toward the mouth 28 of the annular groove 16.

The ribs 70 have a semi-circular cross sectional configuration as viewed in a radial plane which extends perpendicular to the central axis 24 of the seal holder 12 (FIG. 1). The leg portions 82 and 84 taper outward from relatively thick end portions connected with the arcuate bight portions 86 of the ribs 70 to ends at the tips of the lips 30 and 32 and the mouth 28 of the annular groove 16. The bight portion 86 of each of the ribs 70 has a uniform radially inward projecting thickness throughout its extent.

In one specific embodiment of the invention, the bight portion 86 of each rib 70 had a radial thickness of approximately 0.035 inches. Thus, the bight portion 86 of each of the ribs 70 has a radius of 0.035 inches as viewed in a cross sectional plane perpendicular to the central axis 24. It is contemplated that the ribs 70 may have a radial thickness which varies between 0.005 of an inch and 0.075 of an inch or more depending upon the size of the groove 16 and the characteristics of the seal member 14.

In this specific embodiment of the invention, the segments 80 of the bottom 76 of the annular groove 16 have a radius of curvature of approximately 0.0475 inches as viewed in a plane containing a radius and central axis 24 of the groove. The seal member 14 had a diameter of 0.10 inches as viewed in a plane containing a radius and central axis 24 of the seal member. The annular groove 16, itself, has a diameter of approximately 0.820 inches as measured diametrically across the groove between centers of curvature of arcuate segments 80 of the groove. The cylindrical inner side 52 of the main body section 18 has a diameter of 0.768 inches. The cylindrical outer side 36 of the main body section 18 has a diameter of 1.377 inches. The tip 62 of the seal lip 22 has an inside diameter of 0.55 inches.

It should be understood that the foregoing specific dimensions for the annular groove 16, ribs 70, seal member 14, and main body section 18 have been set forth herein for purposes of clarity of description. It is contemplated that various embodiments of the invention will be constructed with dimensions which may differ substantially from these specific dimensions. It is also contemplated that various embodiments of the invention may be constructed with dimensions which are in different proportions relative to each other.

Installation

Figure 5:
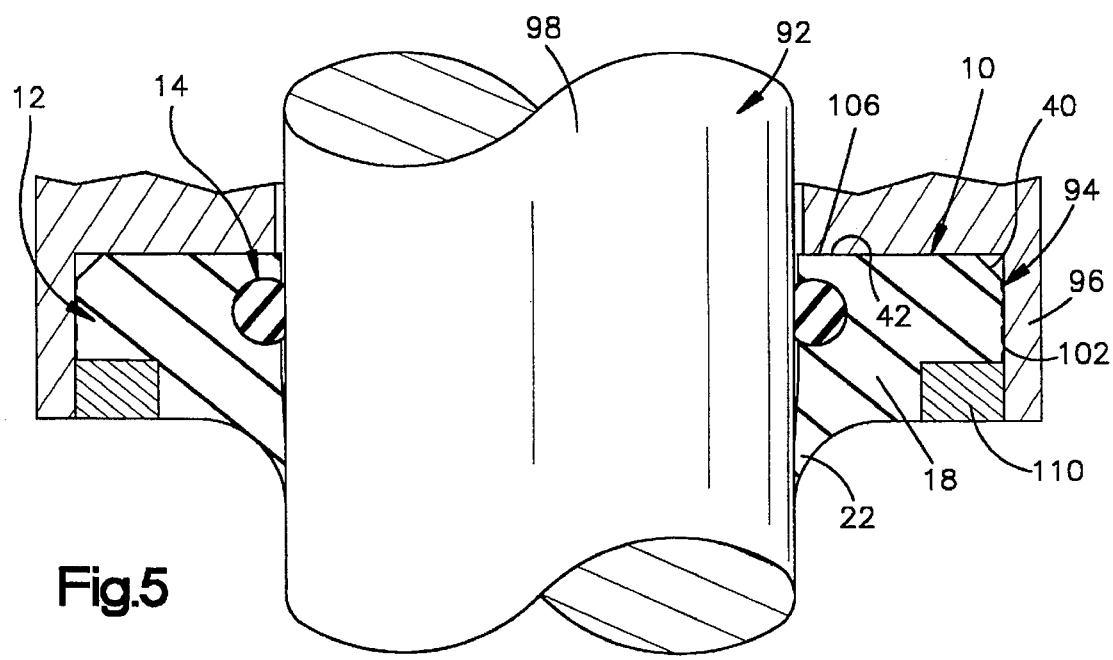
FIG. 5 is a fragmentary sectional view illustrating the seal assembly of FIGS. 3 and 4 installed in association with a rotatable shaft.

The annular seal member 14 is positioned in the annular groove 16 in the seal holder 12 to form the seal assembly 10. This is accomplished by pushing the seal member 14 radially outward through the mouth 28 of the groove 16. The entire seal assembly 10 can then be installed in association with a rotatable cylindrical metal shaft 92 (FIG. 5). The rotatable shaft 92 extends through an annular recess 94 formed in a stationary housing 96. The shaft 92 and housing 96 may be portions of a hydraulic motor or pump having a known construction.

The seal assembly 10 is first moved axially onto the rotatable shaft 92. As the seal assembly 10 is moved onto the shaft 92, the annular seal member 14 is deflected radially outward by engagement with a cylindrical outer side surface 98 of the shaft 92. The seal lip 22 is then deflected axially and radially outward relative to the main body section 18 of the seal assembly 10, in the manner illustrated in FIG. 5. The seal assembly 10 is then moved axially along the shaft 92 toward the recess 94.

As the seal assembly 10 begins to move into the recess 94 in the housing 96, the axially tapered end surface 40 on the leading end of the seal holder 12 engages a circular and axially outer edge portion of a cylindrical side surface 102 of the recess 94. This results in the main body section 18 of the seal assembly 10 being cammed radially inward into the recess 94 during continued axial movement of the seal assembly toward the recess. As this occurs, the annular ribs 38 (FIG. 4) around the circumference of the main body section 18 of the seal holder 12 are sequentially deflected radially inward to sealingly engage the inner side surface 102 (FIG. 5) of the recess 94.

Continued axially inward movement of the seal assembly 10 into the recess 94 moves the flat annular inner side surface 42 on the seal holder 12 into abutting sealing engagement with a flat annular inner side surface 106 of the recess 94 (FIG. 4). An annular metal retainer ring 110 is then inserted into the recess 44 in the seal holder 12. The annular retainer ring 110 (FIG. 5) engages the housing 96 to hold the seal assembly 10 in place in the recess 94 in the housing.

At this time, the annular seal lip 22 (FIG. 5) sealingly engages the outer side surface 98 of the rotatable shaft 92 to block movement of contaminants toward the annular seal member 14. The annular seal member 14 sealingly engages the outer side surface 98 of the rotatable shaft to prevent movement of oil or other liquid from inside the housing 96 axially outward past the annular seal member 14 toward the seal lip 22. At this time, the material of the annular seal member 14 is deflected to completely fill the annular groove 16. The annular seal member 14 sealingly engages both the rotatable shaft 92 and the seal holder 12. The ribs 70 in the annular groove 16 engage the seal member 14 to hold the seal member against rotation relative to the seal holder 12 as the shaft 92 is rotated relative to the stationary housing 96 and seal holder.

Second Embodiment of the Invention

Figure 6:
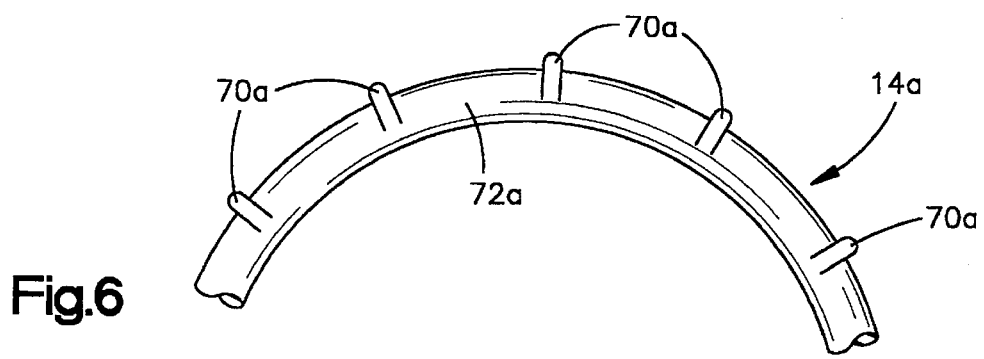
FIG. 6 is a fragmentary view of a portion of a second embodiment of the annular seal member.

In the embodiment of the invention illustrated in FIGS. 1-5, the annular seal member 14 is of the well known O-ring type and has a smooth toroidal outer side surface 72 which is engaged by ribs formed on the seal holder 12. In the embodiment of the invention illustrated in FIG. 6, ribs are integrally formed as one piece with the annular seal member. A seal holder groove in which the seal member is to be mounted, has a smooth inner side surface which forms a portion of a toroid. Since the embodiment of the invention illustrated in FIG. 6 is generally similar to the embodiment of the invention illustrated in FIGS. 1–5, similar numerals will be utilized to designate similar components, the suffix letter "a" being associated with the numerals of FIG. 6 to avoid confusion.

An annular seal member 14a (FIG. 6) is received in an annular groove in a seal holder having the same general construction as the seal holder 12 of FIGS. 1–3. However, rather than being formed as part of the seal holder 12, ribs 70a are integrally formed as one piece with the annular seal member 14a. The annular groove in the seal holder into which the annular seal member 14a is inserted does not have any ribs corresponding to the ribs 70 in the annular groove 16 in the seal holder 12.

The ribs 70a (FIG. 6) have a generally U-shaped cross sectional configuration as viewed in a plane which contains a radius and central axis of the seal member 14a. The ribs 70a extend radially outward from the outer side surface 72a of the annular seal member 14a. The seal member 14a, like the seal member 14 of FIG. 3, is formed of PNF (trademark) (phosphonitrilic fluoroelastomer) which is relatively soft. Thus, the annular seal member 14a may have a hardness of 55–80 Shore A. If desired, the seal member 14a could be formed of a silicone rubber.

The ribs 70a are resiliently deflected by a smooth continuous bottom surface of the annular groove in a seal holder. Engagement of the ribs 70a with the smooth inner side surface of the annular groove in the seal holder retains the O-ring 14a against rotation relative to the seal holder when a rotatable shaft, similar to the shaft 92 of FIG. 4, rotates relative to the seal holder. The ribs 70a are pressed firmly against the bottom of the annular groove in the seal holder and are effective to hold the seal member 14a against rotation relative to the seal holder.

The foregoing description assumes that the seal member 14a will be used with a seal holder having an annular groove with a smooth inner side surface which is free of ribs. However, it is also contemplated that the annular seal member 14a (FIG. 6) may be used with the seal holder 12 of FIG. 1. Thus, the annular seal member 14a may be installed in the annular groove 16 with the ribs 70a on the seal member 14a disposed between the ribs 70 on the seal holder 12.

If there is any relative rotation between the annular seal member 14a and the seal holder 12, the ribs 70a on the annular seal member 14a will move into abutting engagement with the ribs 70 on the seal holder 12 and hold the annular seal member 14a against rotation relative to the seal holder. Thus, the annular seal member 14a of FIG. 6 may be used with a seal holder having an annular groove which is free of ribs or with a seal holder having an annular groove 16 (FIG. 1) with ribs 70 which are engageable by the ribs 70a on the annular seal member 14a to block relative rotation between the seal member and the seal holder.

From the above description of the invention, those skilled in the art will perceive improvements, changes and modifications. Such improvements, changes and modifications within the skill of the art are intended to be covered by the appended claims.

Having described the invention, the following is claimed:

1. A seal assembly for use with a rotatable shaft and a surrounding housing structure, said seal assembly comprising:

an annular seal holder having an annular groove facing radially inward, said seal holder having radially outer sealing means for engaging the housing structure in static sealing contact; and an O-ring with a circular cross-section, said O-ring being disposed in said annular groove and comprising radially inner sealing means for engaging the shaft in rotationally dynamic sealing contact;

said seal holder being free of a bond with said O-ring and having a plurality of axially extending ribs engaging said O-ring in said groove to retard rotation of said O-ring relative to said seal holder.

* * * * *